No. 674,465. Patented May 21, 1901.
C. HENSOLDT.
PRISM TELESCOPE.
(Application filed Nov. 12, 1900.)

(No Model.)

Witnesses:

Inventor:

UNITED STATES PATENT OFFICE.

CARL HENSOLDT, OF WETZLAR, GERMANY.

PRISM-TELESCOPE.

SPECIFICATION forming part of Letters Patent No. 674,465, dated May 21, 1901.

Application filed November 12, 1900. Serial No. 36,229. (No model.)

*To all whom it may concern:*

Be it known that I, CARL HENSOLDT, a subject of the German Emperor, residing at 44 Steinweg, Wetzlar, Germany, have invented certain new and useful Improvements in Prism-Telescopes, of which the following is a specification.

This invention relates to improvements in prism-telescopes.

In the prisms extensively used in connection with prism-telescopes one face of a pentagonal prism is beveled in the form of a saddle-roof, the said beveling producing a reversal of the object. A triangular prism is usually placed against or cemented to the pentagonal prism in such a manner that one face of the triangular prism coincides exactly with the adjacent face of the pentagonal prism. With the arrangement above described—that is to say, with the prisms directly abutting against each other or cemented together—rays entering at the edge of the pentagonal prism are so near to the triangular prism that reflections appear at once if the observation does not take place absolutely in the line of the optical axis. Observations of this kind absolutely in the line of the optical axis allow of only a small undisturbed field of vision.

Figure 1:
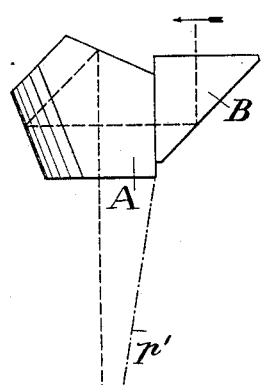
Figure 2:
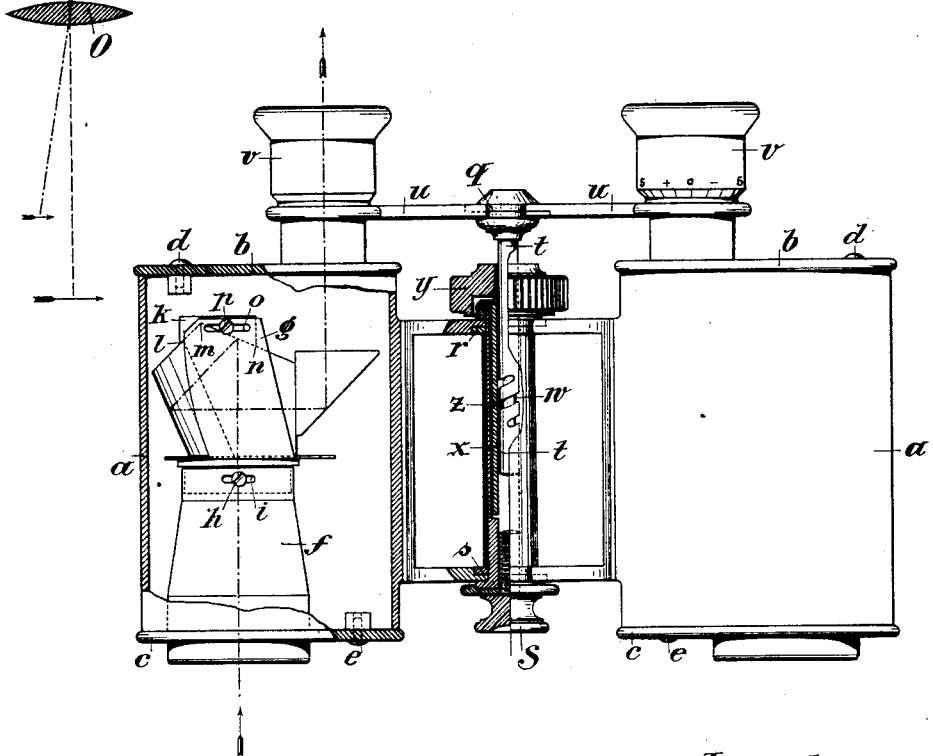

In the annexed drawings, Figure 1 is a diagrammatic view showing the improved arrangement of the prisms, and Fig. 2 shows in partial section a binocular prism-telescope constructed according to this invention.

According to the present invention for the purpose of removing the disadvantages above referred to the two prisms A and B are placed with regard to each other in the position represented in Fig. 1—that is to say, the adjacent faces of the prisms do not coincide, but the edges of the triangular prism are slightly raised above or out of line with those of the pentagonal prism, the triangular prism B being thus displaced in a parallel and vertical sense with regard to the optical axis of the prism A. The entrance of the indirect disturbing reflections is thus prevented, as indicated in said figure. The method of employing this combination is shown in Fig. 2.

To the tube $a$ of the telescope are screwed in the known manner, by means of screws $d$ and $e$, the plates $b$ and $c$, holding, respectively, the eye-lens and the object-glass. Directly to the inside of the frame or setting of the object-glass in the plate $c$ a conical tube $f$ is screwed. Two interconnected walls or supports $g$ for the prisms are connected with the said tube $f$ by means of two opposite screws $h$ in such a manner that when the said screws $h$ are unscrewed the said supports $g$ can be turned on their central axis for a certain distance, determined by the slots $i$. The set of prisms is inserted between the supports $g$. In the example represented in the annexed drawings the said set of prisms is composed of a combination of a pentagonal and a triangular prism. For the purpose of holding the prisms a clamping device $k$, screwed between the supports $g$, is provided. The plates $l\,m$ and $m\,n$ of the said clamping device grip the corresponding faces of the pentagonal prism. For lateral displacement longitudinal slots $o$ are provided in the supports $g$, through which the screws $p$, screwed into the clamping device $k$, are passed. By unscrewing said screws $p$ lateral displacement of the body of prisms, and by unscrewing the screws $h$ rotation of the set of prisms on the axis, is permitted.

If the prism-telescope is used in binocular form the frame can be provided with suitable devices for adjusting the eye-lenses. In this arrangement the outer casing of the telescope can be constructed separately, as the adjustment of the prisms may take place independently and the eye-lenses and object-glasses can be directly connected with the corresponding plates. In order, however, to permit the adjustment of the eye-lenses by rotation on a common axis and also the adjustment of their distance from the object-glasses by means of a mechanism similar to that of binoculars of ordinary construction, an arrangement is made by which the operating mechanism is not situated in the center of the connecting-joint between the two main parts, but below the same, between a joint for the eye-lenses and the cross-pieces connecting the casings of the prisms. The main joints $q$, $r$, and $s$ rotate on a spindle $t$, upon which the two cross-pieces $u$ for the eye-lens tubes $v$ are arranged. This shaft $t$ is provided with an external screw-thread $w$ and engages a rotatable hollow cylinder $x$, provided with a wheel $y$, so that on the latter being revolved the cylinder $x$ revolves and the axial movement of the shaft $t$, carrying the eye-lenses, is rendered possible by means of a pin $z$, rigidly connected with the said cylinder $x$. At the same time the hinge-like rotation of the cross-pieces $u$ renders it possible to advance or recede the ocular lenses. After accurate adjustment of the telescope it can be fixed by means of the screws $s$.

I declare that what I claim is—

1. In a telescope, the combination with a pentagonal and a triangular prism arranged so that the adjacent edges of the latter are slightly raised or out of line with those of the former by which vertical and parallel displacement the entrance of indirectly-disturbing reflections is prevented, of a supporting and clamping device for said prisms and means for permitting axial and lateral adjustment of the prisms with regard to the telescope substantially as described.

2. In a telescope, the combination with a pentagonal and a triangular prism arranged so that the adjacent edges of the latter are slightly raised or out of line with those of the former by which vertical and parallel displacement the entrance of indirectly-disturbing reflections is prevented, of a supporting and clamping device for said prisms consisting of the supports $g$ and plates $l\,m$ and $m\,n$, adapted to grip the pentagonal prism, and means provided with the slots $i$ and $o$ and screws $h$ and $p$ passing through said slots respectively for permitting axial and lateral adjustment of the prisms with regard to the telescope substantially as described.

In witness whereof I have signed this specification in the presence of two witnesses.

CARL HENSOLDT.

Witnesses:
 JEAN GRUND,
 CARL GRUND.